US009870663B2

(12) United States Patent
Gehin et al.

(10) Patent No.: US 9,870,663 B2
(45) Date of Patent: Jan. 16, 2018

(54) AUTHENTICATION OF A USER PROVIDED WITH A MOBILE DEVICE BY A VEHICLE

(71) Applicant: VALEO COMFORT AND DRIVING ASSISTANCE, Creteil (FR)

(72) Inventors: Frédéric Gehin, Créteil (FR); Laurent Petel, Créteil (FR); Hélène Gibourdel, Créteil (FR); Siav Kuong Kuoch, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 0 days.

(21) Appl. No.: 14/917,590

(22) PCT Filed: Sep. 9, 2014

(86) PCT No.: PCT/EP2014/069194
§ 371 (c)(1),
(2) Date: Mar. 9, 2016

(87) PCT Pub. No.: WO2015/032979
PCT Pub. Date: Mar. 12, 2015

(65) Prior Publication Data
US 2016/0225211 A1    Aug. 4, 2016

(30) Foreign Application Priority Data
Sep. 9, 2013   (FR) ..................... 13 02101

(51) Int. Cl.
G05B 19/00    (2006.01)
G07C 9/00     (2006.01)
H04L 29/08    (2006.01)

(52) U.S. Cl.
CPC .......... *G07C 9/00309* (2013.01); *H04L 67/12* (2013.01); *G07C 2009/0042* (2013.01);
(Continued)

(58) Field of Classification Search
None
See application file for complete search history.

(56) References Cited

U.S. PATENT DOCUMENTS 9,241,237 B2 *   1/2016   Hirsch ................... H04L 63/18
9,460,575 B2 *  10/2016   Park ...................  G07C 9/00134
(Continued)

FOREIGN PATENT DOCUMENTS

WO    2006/098690 A1    9/2006
WO    2008/070886 A2    6/2008
WO    2009/152628 A1   12/2009

OTHER PUBLICATIONS

International Search Report issued in PCT/EP2014/069194 dated Dec. 19, 2014 (3 pages).
(Continued)

*Primary Examiner* — K. Wong
(74) *Attorney, Agent, or Firm* — Osha Liang LLP

(57) ABSTRACT

The invention relates to a method of pre-authenticating a user at a vehicle with a view to allowing the user to access the vehicle when a handle provided on a door of said vehicle is actuated, said user being provided with a mobile device, said vehicle and said mobile device each comprising a wireless communication interface operating according to the BLE protocol; each of said interfaces initially being in the "notification" state in which each of said interfaces transmits for a basic transmission time; said method comprising: —steps of connecting said interfaces according to the BLE protocol—steps of identifying and authenticating the mobile device, by the vehicle; a step in which the vehicle stores the identity data or the mobile device if the identification and authentication steps have been completed; —a subsequent step in which, when the handle of the vehicle door is actuated, the interface of the vehicle shifts from the "notification" state to the "scanning" state; —a tenth step in
(Continued)

which the interface in the "scanning" state confirms the presence of the interface of the mobile device in the "notification" state.

15 Claims, 1 Drawing Sheet

(52) U.S. Cl.
 CPC ............ *G07C 2009/00365* (2013.01); *G07C 2209/63* (2013.01); *G07C 2209/65* (2013.01)

(56) References Cited

U.S. PATENT DOCUMENTS

| | | |
|---|---|---|
| 9,516,503 B2 * | 12/2016 | Berns .................... H04W 12/08 |
| 2004/0201277 A1 | 10/2004 | Hentsch et al. |
| 2005/0210283 A1 | 9/2005 | Kato |

OTHER PUBLICATIONS

Written Opinion of the International Searching Authority issued in PCT/EP2014/069194 dated Dec. 19, 2014 (7 pages).

\* cited by examiner

AUTHENTICATION OF A USER PROVIDED WITH A MOBILE DEVICE BY A VEHICLE

TECHNICAL FIELD OF THE INVENTION

The technical field of the invention is that of automobile vehicles and, more particularly, that of access of the hands-free type for accessing an automobile vehicle without a mechanical key. The invention thus relates to a method for pre-authentication of a user by a vehicle, said user being equipped with a mobile device.

The term 'mobile device' in the framework of the present application is understood to mean any device allowing a person to access data and information irrespective of this person's location. The term 'mobile device' encompasses mobile telephones, more particularly of the Smartphone type, laptop computers, tablets, personal digital assistants (PDAs), etc.

In the framework of the present application, 'vehicle access opening' is understood to mean any locked opening of the vehicle requiring the action of a user in order to be unlocked: door, trunk, etc.

PRIOR ART

The hands-free access to an automobile vehicle is generally achieved by means of a Customer Identifier (written as CID in the remainder of the application) not intended to be inserted into the locking mechanism of the access opening of the vehicle to which a user wishes to gain access. This CID takes the form of a badge or of a card that the user keeps with him/her, in a pocket, handbag or wallet for example, and when the user actuates the handle of the access opening, the lock is unlocked. The actuation of the handle of the access opening by the user is a movement initiated by starting to pull the handle and finished by the end of the pulling of the handle by the user. At the end of the movement for operating the handle, i.e. when it has been fully pulled open, if the lock has not been unlocked, it remains locked and the access opening on which the handle is disposed will not be able to be opened by the user. This is commonly referred to as the "barrier effect". For the unlocking of the lock, authentication information is exchanged between the CID and a computer of the vehicle, the computer controlling the unlocking of the lock. The barrier effect occurs when the user has begun to pull the handle and the exchanges of information required for the unlocking of the lock have not finished when the user arrives at the position of end of pulling of the handle. In order to avoid this barrier effect, the exchange of information has to be finished before the end of the pulling of the handle. It is no longer possible for him/her to open the access opening of the vehicle and to access it without releasing the handle and restarting the operation. Thus, once the handle has been pulled too far, even if the lock is unlocked it is no longer possible to open the access opening. This is because the unlocking of the lock consists in mechanically engaging a catch with an opening lever in order for the latter to operate the catch with its movement. If this engaging action takes place once the handle has been pulled too far, the movement of the opening lever will no longer have an effect on the catch.

On average, it is estimated that the time needed for a user to complete the movement for actuation of the handle of the access opening is around 90 ms to which should be added 30 ms of latency for the lock to move mechanically. Thus, the average period of time observed between the start of the pulling of the handle and the opening of the access opening is 120 ms. In order to avoid the barrier effect, the unlocking command must be sent to the lock within around 90 ms after the start of pulling the handle.

Conventionally, the steps to be carried out, in the time prescribed for avoiding the barrier effect, with a view to generating the unlocking command are the following:

detection by the vehicle of the intention of the user to access the vehicle via the locked access opening. This detection is carried out by means of the handle and by means disposed on the handle and connected to a computer of the vehicle; these means are for example either a mechanical switch which detects the start of pulling of the handle, or a proximity sensor that detects the virtual-contact of the hand with the handle;

wake-up of the computer of the vehicle, which wake-up consists in it going from a mode with very low electrical power consumption, only allowing a few simple processing operations, to a mode of operation with a higher performance but a higher power consumption; the wake-up requires the recovery of data in the memory of the µC together with the initialization of some functions;

sending, by the computer of the vehicle, of an authentication challenge to the CID of the user;

the CD of the user calculates a response to the challenge, as a function, amongst others, of an identification key, learnt and stored;

the response to the challenge is sent from the CD to the vehicle;

comparison between the response sent by the CID and the anticipated response;

controlling the unlocking of the lock when the responses are identical.

Once the unlocking command has been sent, the mechanical components of the lock have to move (duration of around 30 ms).

Here, the case is considered of a CID incorporating a Bluetooth® Low Energy (BLE in the following part of the application) interface, the vehicle to which it will be coupled also comprising a BLE interface. Thus, a bidirectional communication channel is established between the vehicle and the CID. Generally speaking, the CID incorporates a Low Frequency (LF in the following part of the application) receiver and the car incorporates an LF antenna, thus a unidirectional LF channel can be established from the car to the CID. There is no establishment of a bidirectional LF channel since, in order to establish a bidirectional channel at LF, it is necessary to incorporate both an LF transmitter component and an LF receiver component, both on the CID and on the vehicle, which is a high-cost scenario.

When the user touches the handle, the computer of the vehicle is woken up, this computer is referred to as "hands-free access computer". The authentication challenge is sent over the LF channel of the vehicle to the CID. The LF receiver of the CID is, for its part, in continual listening mode and hence the exchange of information begins instantaneously. The LF receiver receives the authentication challenge sent by the hands-free access computer and the CID is woken up. The CID then performs the calculation needed for the response to the challenge and sends this result back over the BLE channel. The wake-up step is carried out by means of the LF channel since an LF continual listening process has a lower power consumption that a BLE continual listening process, to the detriment of the speed. The response to the challenge is itself sent back by means of the BLE channel for the reason presented hereinabove and also because a BLE communication is higher speed than LF.

An automobile vehicle to which a user tries to gain access by opening a door generally has the engine turned off. In that case, the only source of power available for the computer of the vehicle and the components of the LF transmitter and of the BLE interface is the battery of the vehicle, it is therefore necessary to limit the power consumption of the vehicle in order not to discharge the battery of the vehicle during the authentication for the accessing of the vehicle. The communication function that uses the BLE channel is time-limited and hence may be used, despite its high power consumption.

A CID is generally powered by a button battery that the user does not wish to change too often; it is therefore necessary to limit the power consumption of the CID so as not to use up the battery of the CID during the continual listening for a wake-up signal. The communication function that uses the BLE channel is time-limited and hence may be used, despite its high power consumption.

The current tendency is toward the integration of the maximum amount of authentication data of a user on the same device, such as a mobile device of the smartphone type. When the CID is integrated into a smartphone, the configuration is different. The reason for this is that the standards in mobile telephony do not include any LF channel in a mobile telephone. The access to the vehicle by means of the smartphone may take place via the BLE channel. In the BLE standard, each element, at any moment in time, is in a certain state, amongst which are:

standby state: the element does nothing, neither transmission, nor reception;

advertizing state: the element continuously transmits data frames intended for other elements that may be listening. It indicates that it is available, its identification and the services that it provides;

scanning state: the element searches within its environment for other elements offering one or more services for exchanging with them;

initiation state: a first element that is in scanning mode discovers an element with a desired service and requests to be connected to it;

connected state: 2 elements are connected and can therefore exchange data.

In the case of the use of a smartphone for unlocking an access opening of a vehicle, the vehicle and the smartphone are continuously in the advertizing state. When a user touches a handle of the vehicle, the vehicle goes into the scanning/listening state and recovers the first advertizing data frame from the smartphone that it hears. A smartphone transmits an advertizing data frame typically around every 100 ms (standard imposed by the smartphone manufacturers). As soon as the vehicle has recovered the advertizing frame of the smartphone, the vehicle sends a connection request to the smartphone in which it requests the list of services provided by the smartphone in order to verify the presence of a service of the "vehicle access" type. The duration of this operation is around 20 ms. Since the smartphone is in the advertizing state, it cannot refuse the connection and the BLE communication channel is established between the vehicle and the smartphone. Then, the vehicle sends the challenge to the smartphone (duration of this operation: around 20 ms) and the vehicle sends back the response to the challenge (duration of this operation: around 20 ms). In total, in order to establish the unlocking of the lock by means of a smartphone using a BLE connection, it currently takes on average 160 ms, which does not allow the aforementioned barrier effect to be overcome. The reduction in the period of advertizing of the smartphone from 100 ms to 30 ms in order to fall below the time threshold of the barrier effect cannot be envisioned because that would lead to energy consumptions that are much too high for the battery of the smartphone.

DESCRIPTION OF THE INVENTION

The invention aims to overcome all or part of the drawbacks of the prior art identified hereinabove, and notably to provide a method allowing the barrier effect, detrimental to the user, to be overcome while at the same time limiting the power consumption of the smartphone.

For this purpose, one aspect of the invention relates to a method for pre-authentication of a user by a vehicle with a view to allowing the access of the user to the vehicle during the actuation of a handle disposed on an access opening of said vehicle, said user being provided with a mobile device, said vehicle and said mobile device each comprising a wireless communications interface according to the Bluetooth® Low Energy protocol, where each of said interfaces can adopt at least one state from amongst the following states: "standby", "advertizing", "scanning", "initiation", "connected", each of said interfaces being initially in the "advertizing" state in which each of said interfaces transmits, for a basic transmission period, at least one set of data comprising, amongst others, identity data and information on availability of a service for access to the vehicle, said method comprising:

a first step in which one of said interfaces goes from the "advertizing" state to the "scanning" state in which said interface searches in its environment for the presence of an interface for a period of time equal to at least the basic transmission period of the other interface, said other interface transmitting a set of data comprising the information on availability of said service for accessing the vehicle, said passage from the "advertizing" state to the "scanning" state taking place over a predetermined period;

a second step in which, if the interface in the "scanning" state identifies the presence of the other interface in the "advertizing" state, the interface in the "scanning" state goes into an "initiation" state in which it requests from the identified interface the establishment of a connection;

a third step in which the interfaces of the vehicle and of the mobile device go into the "connected" state in which they can exchange data;

a fourth step in which the vehicle sends a request for authentication via the interface to the interface of the mobile device;

a fifth step in which the mobile device sends to the interface of the vehicle, via the interface, a data frame containing its response to the authentication request, said data frame also comprising identity data for the mobile device;

a sixth step in which the vehicle verifies the coherence of the authentication response sent by the mobile device;

a seventh step in which, the vehicle stores the identity data for the mobile device, if the authentication response sent by the mobile device is coherent;

an eighth step in which the interfaces of the vehicle and of the mobile device go back into the "advertizing" state;

a ninth step in which, when the handle of the access opening of the vehicle is actuated, the interface of the vehicle goes from the "advertizing" state to the "scanning" state;

a tenth step in which the interface in the "scanning" state validates the presence of the interface of the mobile device in the "advertizing" state by receiving a data frame transmitted by the interface of the mobile device comprising, amongst others, the stored identity data, and allows the access to the vehicle by unlocking said access opening.

The authentication method according to the invention notably allows the barrier effect to be overcome when the user attempts to unlock an access opening of the vehicle. Indeed, carrying out notably the seventh step allows the interface of the mobile device to be pre-authenticated by the vehicle by virtue of the storage of the first identity data value of the mobile device in the memory of the vehicle. The method according to the invention allows the long range capacities of the first and second wireless communications interfaces to be used in order to overcome the barrier effect. Indeed, in the case of a communication using the Bluetooth® Low Energy protocol, the average range is from 30 to 50 m or even 150 m in free field. Thus, given that one of the two interfaces is in the scanning state, in the first step, in order to detect the other interface, the first data frame generated by one of the two interfaces is received by the other interface as soon as the first and second interfaces are within range of one another i.e. before the user is in contact with the car. Pre-authentication steps are thus carried out prior to the user arriving at the vehicle and starting the action of pulling the handle of an access opening of the vehicle. The power consumption of the vehicle or of the mobile device is limited solely to carrying out the first step by the first interface, i.e. the generation of the first data frame which is sent via the first interface. In the case of a BLE communication protocol, the first interface is said to be in "advertizing" mode and it periodically transmits this first data frame which comprises information from the first interface on the service available in order to inform any interfaces around it of its presence and of its availability. The vehicle must dispose of the service for the authentication of a user with a view to accessing an automobile. Aside from the main features which have just been mentioned in the preceding paragraph, the method according to the invention may have one or more complementary features from amongst the following, taken individually or according to the technically possible combinations:

the data frames transmitted by the interface of the mobile device in the "advertizing" state, or during the response to the authentication request, also comprise information on the position of the mobile device;

in the sixth step, using the information on the position of the mobile device, the distance between the vehicle and the mobile device is obtained and is compared with a predetermined threshold distance value;

if the distance is less than or equal to the threshold distance, the method goes to the seventh step, and if the distance is greater than the threshold distance, the method returns to the first step. Thus, notably, the operations for pre-authentication only if the mobile device is situated at a limited distance from the vehicle, for example around ten meters;

in the tenth step, using the information on the position of the mobile device, the distance between the vehicle and the mobile device is obtained and is compared with a predetermined unlocking distance;

if the distance between the vehicle and the mobile device is greater than the predetermined unlocking distance, the unlocking of the access opening is inhibited. Thus, prior to validating the unlocking of the access opening associated with pulling the handle, it is verified that the mobile device really is in the immediate vicinity of the vehicle (typically less than a meter);

the distance between the vehicle and the mobile device is evaluated from one side of the vehicle in order to differentiate the presence of the mobile device on the left or on the right of the vehicle, the unlocking in the tenth step only being authorized if the mobile device is located on the side for the actuation of the handle;

the basic transmission period of the interface of the mobile device is around 100 ms;

the predetermined period for going from the "advertizing" state to the "scanning" state for one of said interfaces is of the order of a few seconds, preferably 10 seconds. Thus, the power consumption in the mobile device is limited by imposing a transmission period for the mobile telephone less than the listening period (scanning state) of the automobile vehicle. Thus, if the interface of the mobile telephone generates the data frame every 100 ms (depending on the capacities of the battery of the mobile device and at the minimum every 20 ms owing to the manufacturer's characteristics which in the case of a BLE protocol limit this first period to 20 ms), the second interface is in the scanning state for a period for example of 100 ms every 10 seconds;

the identity data for the mobile device stored in the seventh step are valid for a predetermined validity time. The mobile device is thus pre-authenticated by the vehicle, by the storage of the identity data in the memory of the vehicle, for a predetermined period of time, for example 30 s, which allows the user to finish his/her physical approach to the vehicle in order to operate the handle;

in the eighth step, the interface of the mobile device goes into the "advertizing" state with a modified transmission period less than the transmission period in the basic "advertizing" mode, during the validity time;

the modified transmission period is fixed at half of the basic transmission period;

in the eighth step, the data frames transmitted by the interface of the mobile device, in the "advertizing" state, also comprise rolling code being updated as a function of the relative or absolute time, or as a function of an incrementation. Thus, for example, a person of malicious intent having succeeded in intercepting identification data for the mobile device will not be able to use the intercepted data later on to open the vehicle, because said intercepted data contain information representative of the moment at which the data will have been intercepted. The time or incremental information will therefore be obsolete when the intercepted data is used later on.

BRIEF DESCRIPTION OF THE FIGURES

Other features and advantages of the invention will become apparent upon reading the description that follows, with reference to the appended figures, which illustrate.

For greater clarity, identical or similar elements are identified by identical reference signs throughout all of the figures.

DETAILED DESCRIPTION OF ONE EMBODIMENT

FIGS. 1 to 4 illustrate various steps of a method for pre-authentication of a user by a vehicle according to a first embodiment of the invention.

Figure 1:
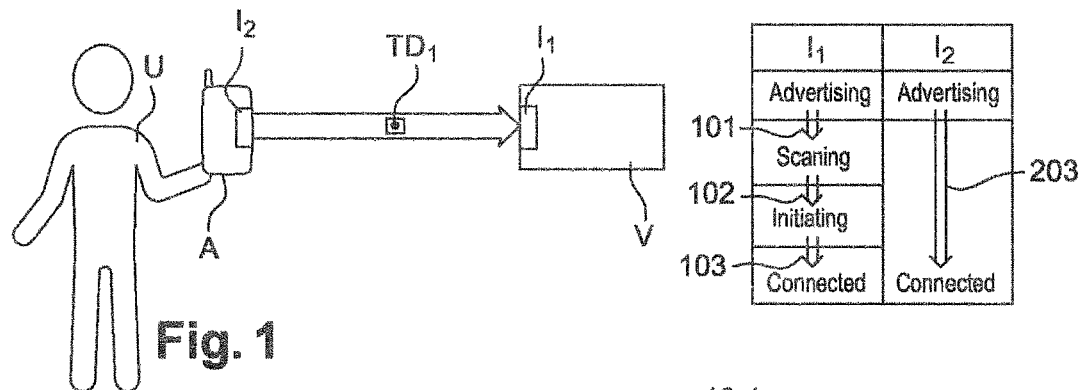
in FIG. 1, a schematic representation of the operation of first steps of one exemplary embodiment of the method according to the invention.

FIG. 1 illustrates a first step 101, a second step 102 and a third step 103 of one exemplary embodiment of the method according to the invention. This figure shows a user U provided with a mobile device A and a vehicle V. The vehicle V comprises a first wireless communications interface I1, and the mobile device A comprises a second wireless communications interface I2. The first interface I1 and the second interface I2 are capable of communicating according to the BLE protocol. According to the embodiment described, the first interface I1 and the second interface I2 are in the "advertizing" state; thus, the first interface I1 and the second interface I2 transmit at least one data frame comprising, amongst others, identity data and information on availability of a specific service for accessing the vehicle. The interfaces thus periodically transmit information in order to make the surrounding BLE equipment aware of their presence, of their characteristics and of their availability for the establishment of a BLE communication channel.

The transmission of the data frames is carried out for a basic transmission period: the first interface I1 transmits for a first basic transmission period and the second interface I2 transmits for a second basic transmission period, typically of the order of one hundred milliseconds.

The first step 101 of the example described consists in making the interface I1 of the vehicle V go from the advertizing state to the scanning state. Such a change of state advantageously takes place every few seconds, typically every ten seconds. The first interface is then able to search within its environment, in other words within its communications coverage area according to the BLE protocol, for the presence of a communications interface transmitting according to the BLE protocol. The scanning state of the interface I1 is adopted for a period of time equal to at least the basic transmission period of the interface I2 of the mobile device A, and is operated for a predetermined period. This thus provides the certainty that the interface I2 will be 'heard' by the interface I1 if the interface I2 is in the area of coverage of the interface I1. The interface I2 of the mobile device A transmits a first data frame TD1 comprising the information on availability of said service for accessing the vehicle V. If the interface I1 of the vehicle V in the scanning state identifies the presence of the interface I2 of the mobile device A in the advertizing state, then, in a second step 102, the interface I1 of the vehicle V goes from the scanning state to the initiation state in which it requests from the identified interface I2 the establishment of an encrypted connection.

The method then goes to a third step 103 in which the interfaces I1 of the vehicle V and the interface I2 of the mobile device A go to the "connected" state in which they can exchange encrypted data.

In other exemplary embodiments of the method according to the invention, it is the interface I2 of the mobile device that goes from the advertizing state to the scanning state, the role of the interfaces I1 and I2 being reversed up to the establishment of the connection between the two interfaces during the third step 103. The example described in FIG. 1 seems to be more advantageous for limiting as far as possible the power consumed by the mobile telephone.

Figure 2:
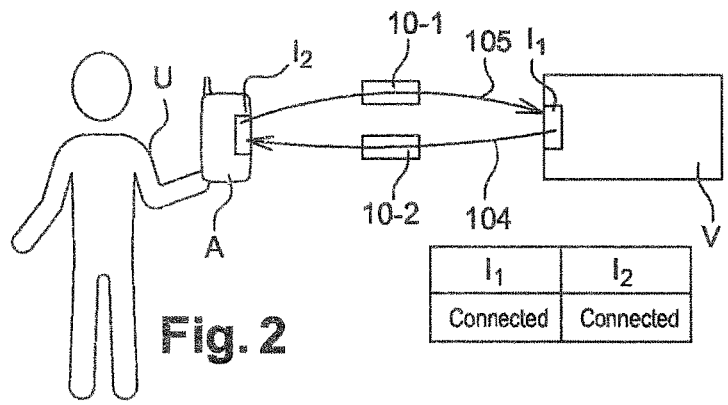
in FIG. 2, a schematic representation of the operation of following steps taking place following the first steps shown in FIG. 1 for the implementation of the same example.

FIG. 2 illustrates a fourth step 104 and a fifth step 105 of one exemplary embodiment of the method according to the invention. This figure represents the fact that, in the fourth step 104, the vehicle V sends a request for authentication 10-2 via the interface I1 to the interface I2 of the mobile device A. In the fifth step 105, the mobile device A then sends, via the interface I2, to the interface I1 of the vehicle V, a data frame 10-1 containing its response to the authentication request, said data frame 10-1 also comprising identity data for the mobile device A.

In this fourth step 104 and this fifth step 105, the two interfaces I1 and I2 remain in a "connected" state.

Figure 3:
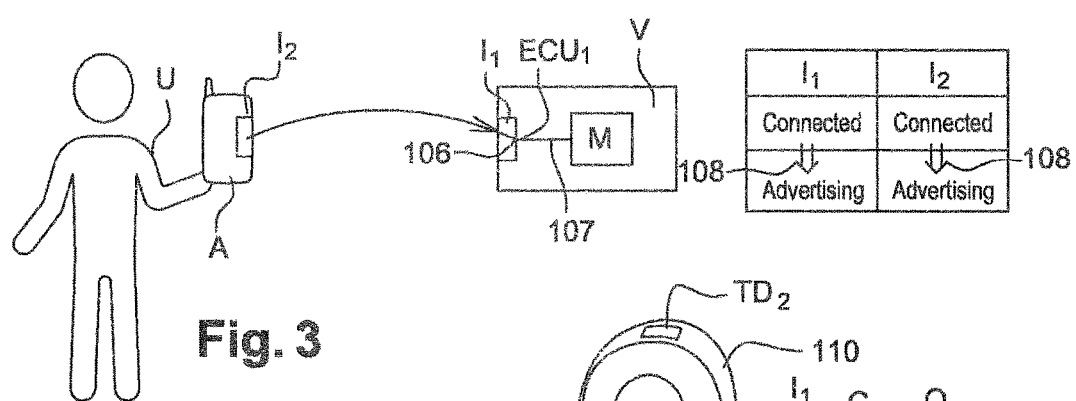
in FIG. 3, a schematic representation of the operation of following steps taking place following the first steps shown in FIG. 2 for the implementation of the same example.

FIG. 3 illustrates a sixth step 106, a seventh step 107 and an eighth step 108 of one exemplary embodiment of the method according to the invention. This figure represents the fact that, in the sixth step 106, by means of an electronic control unit ECU1 of the vehicle V, the vehicle V verifies the coherence of the authentication response sent by the mobile device A.

Advantageously, the data frame 10-1, or following frames sent immediately after the data frame 10-1 in the fifth step (105), comprises information on the position of the mobile device A. In such a case, the authentication will be validated only if the mobile device A is located at a distance from the vehicle V less than a previously-determined threshold distance. If the distance between the vehicle V and the mobile device A is greater than the threshold distance, the method according to the invention returns to the first step 101.

If the authentication response sent by the mobile device A is coherent, and hence validated, then, in a seventh step 107, the vehicle V stores the identity data for the mobile device A in a memory M controlled by the electronic control unit ECU1 of the vehicle V. Advantageously, the identity data are only stored in the memory M for a limited validity time, of the order of a few tens of seconds, typically around thirty seconds, so as to leave the time for the user U to effectively access the vehicle V. Beyond this validity time, the identity data are deleted, the presence of the user U near to the vehicle V clearly not corresponding to a desire to open the vehicle V. An eighth step 108 is then carried out in which the interfaces I1 and I2 of the vehicle V and of the mobile device A return to the "advertizing" state. In this new "advertizing" state, a new period of transmission for the interface I2 of the mobile device A is advantageously provided that is less than the second basic transmission period used during the first step 101 which was of the order of a hundred milliseconds. The new period of transmission for the interface I2 is advantageously of the order of fifty milliseconds. Thus, the mobile device A will be able to be identified more quickly by the vehicle V. The energy spent by the mobile device A is then higher, but this does not constitute a real handicap because the new basic transmission period is only maintained during the ninth step 109. The data transmitted from the interface I2 of the mobile device to the interface I1 of the vehicle V advantageously comprise a time stamp providing information on the moment of this transmission.

Figure 4:
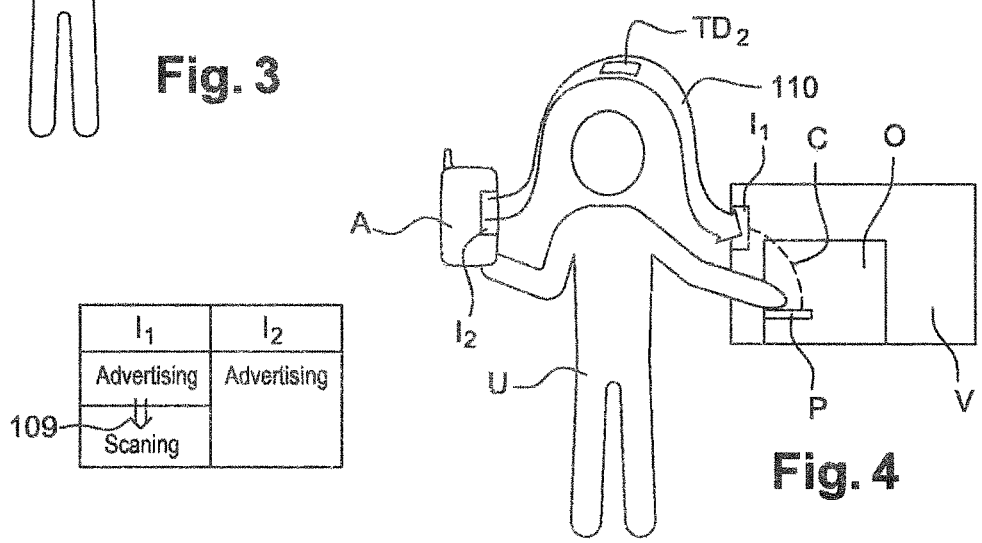
in FIG. 4, a schematic representation of the operation of following steps taking place following first steps shown in FIG. 3 for the implementation of the same example.

FIG. 4 illustrates a ninth step 109 and a tenth step 110 of one exemplary embodiment of the method according to the invention. This figure represents the fact that, in the ninth step 109, the user U exerts an action on a handle P of an access opening O, here a door, of the vehicle V, for a period equal to the validity time during which the identification data for the mobile device A are stored in the memory M. The handle P of the access opening O is equipped with sensors C allowing the action of the user U on the handle to be transferred to the first interface I1. When the start of the pulling of the handle is detected, the first interface I1 of the vehicle V then goes into a scanning state in this step 109, in other words it is configured for receiving a data frame. Since the second interface I2 of the mobile device went back into the advertizing state during the eighth step 108, in a tenth step 110, it generates a second data frame TD2. The second data frame TD2 is received by the interface I2 of the vehicle V. The second data frame TD2 notably comprises information on the identity of the mobile device A. The electronic control unit of the vehicle ECU1 carries out a comparison between the identity information received and the identity data previously stored in the memory M during the seventh step 107. If the two elements—the identity information received and the identity data stored—correspond, the electronic control unit transmits an unlocking command to the lock of the access opening O of the vehicle V which then unlocks.

Advantageously, the data frame TD2, or following frames sent immediately after the data frame 10-2 in the tenth step 110, comprises information on the position of the mobile device A. In such a case, the unlocking command will only be transmitted if the mobile device A is located at a distance from the vehicle V that is less than a previously determined unlocking distance. If the distance between the vehicle V and the mobile device A is greater than the unlocking distance, typically less than one meter, the unlocking command is not transmitted.

In one advantageous embodiment, starting from the step 107, in other words when the vehicle V and the mobile device are in the "connected" state and the mobile device has been correctly authenticated, it is provided for the vehicle V to indicate to the mobile device A to introduce into its future data frames TD2, in addition to the standard message, a rolling code. Thus, between two frames TD2, the message transmitted will be different due to the fact that the code will have been updated.

This updating allows a person of malicious intent, having succeeded in intercepting a data frame TD2 transmitted by the interface I2 in "advertizing" mode starting from the eighth step 108, to be prevented from using the intercepted data later on for opening the vehicle, because said intercepted data contain obsolete information.

The rolling code may be a function of an absolute or relative clock starting from the step 108. In an alternative, the rolling code will be a function of an incrementation between each successive frame defined from the step 108.

In one alternative embodiment, starting from the step 108, the mobile device transmits "advertizing" frames, but the rolling code calculated is only transmitted during the step 109 during which the vehicle goes to an "active scanning" state instead of the simple "scanning" state. In this configuration, the vehicle in the "active scanning" state calls for the mobile device A to transmit the "advertizing" frames with addition of an additional frame representative of the calculated rolling code.

Advantageously, the interpretation is provided of the information on distance between the vehicle V and the mobile device A for determining whether the user U is situated on the left side or on the right side of the vehicle; thus, the unlocking command is only transmitted if the handle is pulled on the side of the vehicle on which the presence of the mobile device has been detected.

The number of exchanges between the interfaces I1 and I2 is thus limited between the moment when the user U touches the handle P and the moment when it may be unlocked, which allows the barrier effect to be avoided. Indeed, the operations for exchanges of information between the two interfaces I1 and I2 carried out even before the start of the pulling of the handle do not need to be repeated. In one alternative embodiment not described, it may be envisioned for the mobile device to be a CID identifier provided with a BLE interface. In this scenario, the initial state of the CID is the "standby" state and, in the step 101, it will be provided for the BLE interface of the CID to go from the "standby" state to the "scanning" state.

The invention claimed is:

1. A method for pre-authentication of a user by a vehicle with a view enabling the access of the user to the vehicle during the actuation of a handle disposed on an access opening of said vehicle, said user being provided with a mobile device, said vehicle and said mobile device each comprising a wireless communications interface, said method comprising:

a first step in which one of said interfaces goes from an "advertizing" state to a "scanning" state in which said interface searches within its environment for the presence of an interface, for a period of time equal to at least the basic transmission period of the other interface, said other interface transmitting a set of data comprising the information on availability of said service for accessing the vehicle, said passage from the "advertizing" state to the "scanning" state taking place over a predetermined period (Ps);

a second step in which, if the interface in the "scanning" state identifies the presence of the other interface in the "advertizing" state, the interface in the "scanning" state goes into an "initiation" state in which it requests from the identified interface the establishment of a connection;

a third step in which the interfaces of the vehicle and of the mobile device go into the "connected" state in which they can exchange data;

a fourth step in which the vehicle sends, via the interface, a request for authentication to the interface of the mobile device;

a fifth step in which the mobile device sends, via the interface, a data frame containing its response to the authentication request to the interface of the vehicle, said data frame also comprising identity data for the mobile device;

a sixth step in which the vehicle verifies the coherence of the authentication response sent by the mobile device;

a seventh step in which the vehicle stores the identity data for the mobile device, if the authentication response sent by the mobile device is coherent;

an eighth step in which the interfaces of the vehicle and of the mobile device go back into the "advertizing" state;

a ninth step in which, when the handle of the access opening of the vehicle is actuated, the interface of the vehicle goes from the "advertizing" state to the "scanning" state;

a tenth step in which the interface in the "scanning" state validates the presence of the interface of the mobile device in the "advertizing" state by receiving a data frame transmitted by the interface of the mobile device comprising, amongst others, the stored identity data, and allows the access to the vehicle by unlocking said access opening, wherein each of the interfaces of the vehicle and the mobile device is a wireless communications interface according to the Bluetooth® Low Energy (BLE) protocol, where each of said interfaces adopts at least one state from the group of states consisting of: "standby", "advertizing", "scanning", "initiation", "connected", each of said interfaces being initially in the "advertising" state in which each of said interfaces transmits, for a basic transmission period, a set of data comprising at least identity data and information on availability of a service for accessing the vehicle.

2. The method as claimed in claim 1, wherein the data frames transmitted by the interface of the mobile device, in the "connected" state during the fifth step or in the "advertizing" state during the tenth step, also comprise information on the position of the mobile device.

3. The method as claimed in claim 2, wherein, in the sixth step, using the information on the position of the mobile device, a distance between the vehicle and the mobile device is obtained and is compared with a predetermined threshold distance value.

4. The method as claimed in claim 3, wherein, if the distance is less than or equal to the threshold distance the method goes to the seventh step, and, if the distance is greater than the threshold distance, the method returns to the first step.

5. The method as claimed in claim 3, wherein, in the tenth step, using the information on the position of the mobile device, the distance between the vehicle and the mobile device is obtained and is compared with a predetermined unlocking distance.

6. The method as claimed in claim 5, wherein, if the distance between the vehicle and the mobile device is greater than the unlocking distance, the unlocking of the access opening is inhibited.

7. The method as claimed in claim 6, wherein the distance between the vehicle and the mobile device is evaluated from one side of the vehicle in order to differentiate the presence of the mobile device on the left or on the right of the vehicle, the unlocking in the tenth step only being authorized if the mobile device is located on the side of the actuation of the handle.

8. The method according to claim 1, wherein the basic transmission period for the interface of the mobile device is around 100 ms.

9. The method according to claim 1, wherein the predetermined period for going from the "advertizing" state to the "scanning" state of one of said interfaces is of the order of 10 seconds.

10. The method according to claim 1, wherein the identity data for the mobile device stored in the seventh step are valid for a predetermined validity time.

11. The method as claimed in claim 10, wherein, in the eighth step, the interface of the mobile device goes into the "advertizing" state with a modified transmission period less than the transmission period in the basic "advertizing" mode, for a period equal to the validity time.

12. The method as claimed in claim 11, wherein the modified transmission period is fixed at half the basic transmission period.

13. The method according to claim 1, wherein, starting from the eighth step, the data frames transmitted by the interface of the mobile device, in the "advertizing" state, also comprise a rolling code.

14. The method as claimed in claim 13, wherein the rolling code is a function of the absolute or relative time defined starting from the eighth step.

15. The method as claimed in claim 13, wherein the rolling code is a function of an incrementation defined starting from the eighth step.

* * * * *